(12) United States Patent
Uchida et al.

(10) Patent No.: US 8,876,649 B2
(45) Date of Patent: Nov. 4, 2014

(54) WELDING STRUCTURE AND METHOD FOR MANUFACTURING WELDING STRUCTURE

(75) Inventors: Keisuke Uchida, Nagoya (JP); Shingo Iwatani, Miyoshi (JP); Go Kuramoto, AiChi (JP); Jun Kamitake, Toyota (JP); Shuhei Yamaguchi, Kariya (JP); Takahito Endo, Toyota (JP); Shotaro Kato, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 14/236,855

(22) PCT Filed: Aug. 4, 2011

(86) PCT No.: PCT/JP2011/067853
§ 371 (c)(1),
(2), (4) Date: Feb. 3, 2014

(87) PCT Pub. No.: WO2013/018223
PCT Pub. Date: Feb. 7, 2013

(65) Prior Publication Data
US 2014/0179482 A1    Jun. 26, 2014

(51) Int. Cl.
*F16H 48/00* (2012.01)
*B23K 31/00* (2006.01)
*B23K 26/24* (2014.01)
*B32B 15/01* (2006.01)
*F16H 48/40* (2012.01)
*B32B 7/04* (2006.01)

(52) U.S. Cl.
CPC ............... *F16H 48/40* (2013.01); *B32B 15/01* (2013.01); *B32B 7/04* (2013.01)
USPC ....... 475/220; 475/248; 74/606 R; 29/525.14; 219/121.64

(58) Field of Classification Search
USPC ............... 475/220, 248; 29/525, 525.14, 893; 219/121.64; 228/126, 128, 131, 132, 228/135, 136, 137, 178, 225; 74/606 R
See application file for complete search history.

(56) References Cited

U.S. PATENT DOCUMENTS

| 5,431,486 A | 7/1995 | Kamahori |
| 2001/0094798 | 4/2012 | Uchida et al. |

(Continued)

FOREIGN PATENT DOCUMENTS

| JP | 62-038787 A | 2/1987 |
| JP | 03-014066 U | 2/1991 |

(Continued)

OTHER PUBLICATIONS

International Search Report in WO2013/018223 (PCT/JP2011/067853), published Nov. 8, 2011.

*Primary Examiner* — Jacob S Scott
(74) *Attorney, Agent, or Firm* — Kenyon & Kenyon LLP

(57) ABSTRACT

Assuming that a direction in which a first member and a second member are arranged is a first direction and a direction orthogonal to the first direction is a second direction, a welding structure includes: a pressure fit portion; a first cavity; a second cavity; a first weld bead formed between the first cavity and an end of a joining part of the first member and the second member on one side in the second direction by welding the first member and second member while the second cavity is communicated with outside; a second weld bead formed between the second cavity and an end of the joining part on the other side in the second direction; and a cutout groove communicating between the first cavity and the second cavity.

10 Claims, 26 Drawing Sheets

(56) References Cited

U.S. PATENT DOCUMENTS

2012/0295125 A1    11/2012  Uchida et al.
2013/0195545 A1*    8/2013  Tsuchida et al. ............. 403/270

FOREIGN PATENT DOCUMENTS

| | | |
|---|---|---|
| JP | 06-143904 A | 5/1994 |
| JP | 07-284926 A | 10/1995 |
| JP | 08001327 A | 1/1996 |
| JP | 10-231918 A | 2/1998 |
| JP | 2010-207850 A | 9/2010 |
| JP | 2011-000624 A | 1/2011 |
| WO | 2011-089704 A1 | 7/2011 |
| WO | 2011-089706 A1 | 7/2011 |

* cited by examiner

WELDING STRUCTURE AND METHOD FOR MANUFACTURING WELDING STRUCTURE

CROSS-REFERENCE TO RELATED APPLICATIONS

This is a national phase application based on the PCT International Patent Application No. PCT/JP2011/067853 filed on Aug. 4, 2011, the entire contents of which are incorporated herein by reference.

TECHNICAL FIELD

The present invention relates to a welding structure for joining a functional component and a case and a method for manufacturing the welding structure. For example, the functional component and the case conceivably include a plurality of components or parts such as a differential ring gear and a differential case in a differential device in a car.

BACKGROUND ART

Patent Document 1 discloses a technique that an outer peripheral surface of a flange member is placed in contact with an inner peripheral surface of a gear member, and they are welded by laser from both sides of the gear member in a central axis direction.

RELATED ART DOCUMENTS

Patent Documents

Patent Document 1: JP-A-10(1998)-231918

SUMMARY OF INVENTION

Problems to be Solved by the Invention

However, in the welding structure manufactured by the technique in Patent Document 1, if the gear member is a helical gear, tensile stress and compression stress are repeatedly generated at an end of weld bead during an operating condition of transmitting power to the gear member. Thus, weld strength may be insufficient thereto. Further, the gear member is subjected to laser welding from both sides in the central axis direction. Accordingly, gas generated during welding is enclosed in the weld bead, which may cause deterioration of weld quality such as weld strength.

Therefore, the present applicant proposed an invention related to a joining part between a differential case 100 and a differential ring gear 102 as shown in FIG. 33, which is disclosed in WO 2011/089706. This invention includes a cavity 106 and a cavity 108 on both sides of a press-fit portion 104, and further a through hole 110 formed to provide communication between the cavity 106 and the outside. According to this invention, a weld bead 112 is formed reaching to the cavity 106 and a weld bead 114 is formed reaching to the cavity 108, thereby enabling reduction in the generation of blowholes and residual stress. Thus, weld quality can be improved. Furthermore, the press-fit portion 104 is left without being melted during welding to maintain a joining state between the differential case 100 and the differential ring gear 102 under welding. Checking whether the weld bead 112 has been formed reaching to the cavity 106 can be made through the through hole 110.

However, the cavity 106 and the cavity 108 are separated by the press-fit portion 104. In order to discharge the gas expanded by heat in the cavities 106 and 108 during welding to the outside to decrease the internal pressures in the cavities 106 and 108, the through holes 110 have to be provided in both the side of the cavity 106 and the side of the cavity 108. Accordingly, a machining cost may be increased and a concentration of stress on the through holes 110 may deteriorate the strength of the differential case 100.

The present invention has a purpose to provide a welding structure capable of providing improved weld quality with reduced cost, and a method for manufacturing the welding structure.

Means of Solving the Problems

To achieve the above purpose, one aspect of the invention provides a welding structure in which a first member and a second member are joined to each other by welding, wherein assuming that a direction in which the first and second members are arranged is a first direction and a direction perpendicular to the first direction is a second direction, the welding structure includes: a press-fit portion in which the second member is press-fit on the first member; a first cavity formed on one side of the press-fit portion in the second direction; a second cavity formed on the other side of the press-fit portion in the second direction; a first weld bead formed between the first cavity and an end of a joining part between the first member and the second member on the one side in the second direction in such a manner that the first and second members are welded to each other while the second cavity is communicated with outside; a second weld bead formed between the second cavity and an end of the joining part on the other side in the second direction; and a cutout groove communicating between the first cavity and the second cavity.

According to the above configuration, there is provided the cutout groove communicating between the first cavity and the second cavity. Thus, the gas expanded in the first cavity when the weld bead is formed is allowed to flow from the first cavity to the second cavity through the cutout groove, and then the gas is discharged out of the second cavity. Accordingly, the welding structure between the first and second members can provide improved weld quality with reduced cost.

The above configuration, preferably, further includes a through hole to communicate the second cavity with the outside.

According to the above configuration, there is provided the through hole communicating the second cavity with the outside. Thus, when the first weld bead is formed, the gas expanded in the first cavity is allowed to be surely discharged to the outside. Further, when the second weld bead is formed, the gas expanded in the second cavity is allowed to be surely discharged to the outside. Consequently, the welding structure between the first and second members can provide reliably improved weld quality.

In the above configuration, preferably, the first weld bead is formed by welding of the first and second members to each other while the second cavity is communicated with the outside through a gap formed between the first and second members.

According to the above configuration, the first weld bead is formed by welding the first and second members to each other while the second cavity is communicated with the outside through the gap formed between the first member and the second member. Thus, when the first weld bead is formed, the gas expanded in the first cavity can be surely discharged to the outside. Consequently, the welding structure between the first and second members can provide reliably improved weld quality.

The above configuration, preferably, further includes: an engagement portion inserted in and engaged with the cutout groove; and a communication hole formed between the cutout groove and the engagement portion to communicate between the first cavity and the second cavity.

According to the above configuration, there is provided the engagement portion inserted in and engaged with the cutout groove. This engagement between the cutout groove and the engagement portion can prevent the first member and the second member from relatively rotating with respect to each other.

Furthermore, there is provided the communication hole formed between the cutout groove and the engagement portion to communicate between the first cavity and the second cavity. Thus, when the first weld bead is formed, the gas expanded in the first cavity is allowed to be surely discharged to the outside. Consequently, the welding structure between the first member and the second member can provide reliably improved weld quality.

In the above configuration, preferably, the first member is a differential case in a differential device, and the second member is a differential ring gear in the differential device.

According to the above configuration, the first member is a differential case and the second member is a differential ring gear, so that the welding structure between the differential case and the differential ring gear in the differential device can provide improved weld quality.

To achieve the above purpose, another aspect of the invention provides a method for manufacturing a welding structure in which a first member and a second member are joined to each other by welding, wherein assuming that a direction in which the first and second members are arranged is a first direction and a direction perpendicular to the first direction is a second direction, the welding structure includes: a press-fit portion in which the second member is press-fit on the first member; a first cavity formed on one side of the press-fit portion in the second direction; a second cavity formed on the other side of the press-fit portion in the second direction; a first weld bead formed between the first cavity and an end of a joining part between the first member and the second member on the one side in the second direction; a second weld bead formed between the second cavity and an end of the joining part on the other side in the second direction; a cutout groove communicating between the first cavity and the second cavity, and the method includes forming the first weld bead by welding the first member and the second member to each other while the second cavity is communicated with outside and the first cavity and the second cavity are communicated with each other through the cutout groove.

According to the above configuration, the first weld bead is formed by welding the first member and the second member while the second cavity is communicated with the outside, and the first cavity and the second cavity are communicated with each other through the cutout groove. Thus, the gas expanded in the first cavity when the first weld bead is formed is allowed to flow from the first cavity to the second cavity through the cutout groove, and then is discharged outside from the second cavity. Consequently, the welding structure between the first member and the second member can provide improved weld quality with reduced cost.

In the above configuration, preferably, the welding structure includes a through hole to communicate the second cavity with the outside.

According to the above configuration, the welding structure includes the through hole communicating the second cavity with the outside. Thus, when the first weld bead is formed, the gas expanded in the first cavity is allowed to be surely discharged to the outside. Further, when the second weld bead is formed, the gas expanded in the second cavity is allowed to be surely discharged to the outside. Consequently, the welding structure between the first member and the second member can provide reliably improved weld quality.

In the above configuration, preferably, when the first weld bead is to be formed, the second cavity is communicated with the outside through a gap formed between the first member and the second member.

According to the above configuration, when the first weld bead is to be formed, the second cavity is communicated with the outside though the gap formed between the first member and the second member. This makes it possible to surely discharge the gas expanded in the first cavity to the outside when the first weld bead is formed. Consequently, the welding structure between the first member and the second member can provide reliably improved weld quality.

In the above configuration, preferably, the welding structure includes an engagement portion inserted in and engaged with the cutout groove, and a communication hole formed between the cutout groove and the engagement portion to communicate between the first cavity and the second cavity.

According to the above configuration, the welding structure includes the engagement portion inserted in and engaged with the cutout groove. This engagement between the cutout groove and the engagement portion can prevent the first member and the second member from relatively rotating with respect to each other.

Further, there is provided the communication hole between the cutout groove and the engagement portion to communicate between the first cavity and the second cavity. Thus, when the first weld bead is formed, the gas expanded in the first cavity is allowed to be surely discharged to the outside. Consequently, the welding structure between the first member and the second member can provide reliably improved weld quality.

In the above configuration, preferably, the first member is a differential case in a differential device, and the second member is a differential ring gear in the differential device.

According to the above configuration, the first member is a differential case and the second member is a differential ring gear, so that the welding structure between the differential case and the differential ring gear in the differential device can provide reliably improved weld quality.

Effects of the Invention

According to the welding structure and the method for manufacturing the welding structure of the present invention, it is possible to improve weld quality with reduced cost.

MODE FOR CARRYING OUT THE INVENTION

A detailed description of a preferred embodiment of the present invention will now be given referring to the accompanying drawings. As one example, the following explanation is given to a welding structure between a differential case and a differential ring gear which are components of a differential subassembly (a differential device) of a vehicle such as a car. However, the present invention is also applicable to a welding structure for other various components.

Example 1

Explanation of Welding Structure

Figure 1:
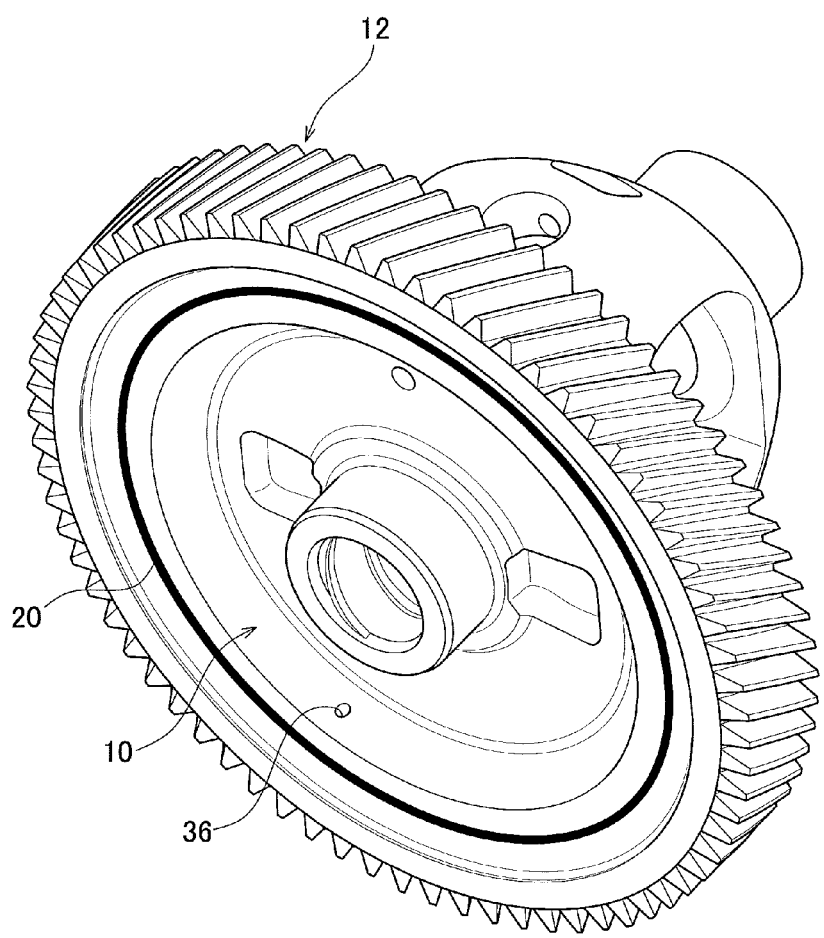
FIG. 1 is an external perspective view of a welding structure between a differential case and a differential ring gear in Example 1.
Figure 2:
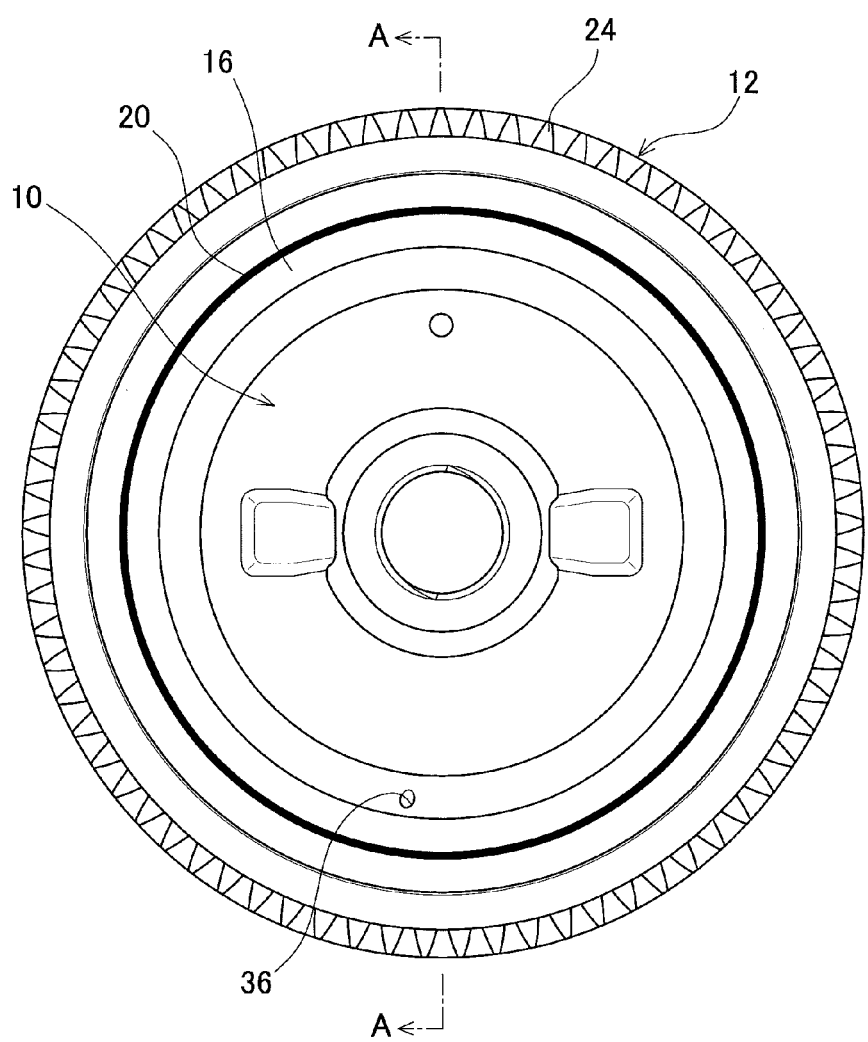
FIG. 2 is a plan view of the welding structure between the differential case and the differential ring gear in Example 1.
Figure 3:
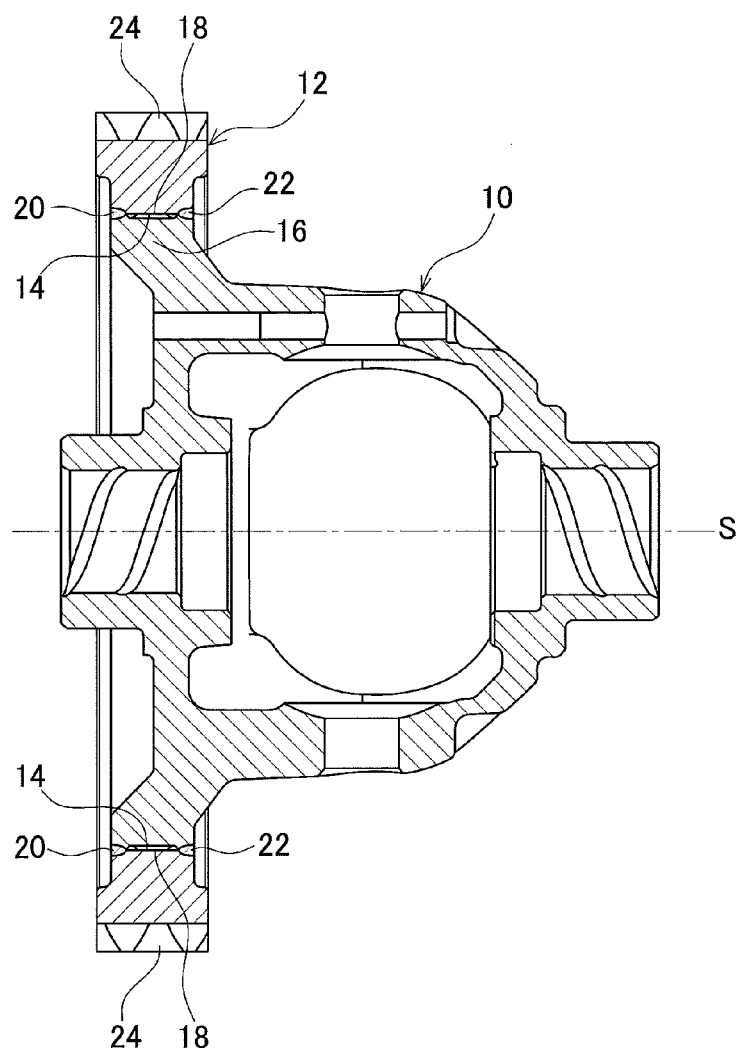
FIG. 3 is a cross sectional view taken along a line A-A in FIG. 2.

A welding structure of the present example will be first explained. FIG. 1 is an external perspective view of a welding structure between a differential case 10 and a differential ring gear 12 in the present example. FIG. 2 is a plan view of the welding structure between the differential case 10 and the differential ring gear 12 in the present example. FIG. 3 is a cross sectional view taken along a line A-A in FIG. 2.

As shown in FIGS. 1 to 3, the welding structure of the present example is configured such that the differential case 10 is inserted inside an inner peripheral surface 14 of the annular differential ring gear 12. An outer peripheral surface 18 of an annular flange 16 of the differential case 10 and the inner peripheral surface 14 of the differential ring gear 12 are joined to each other by welding. Thus, a weld bead 20 and a weld bead 22 are circumferentially formed along the inner peripheral surface 14 of the differential ring gear 12 (the outer peripheral surface 18 of the flange 16). It is to be noted that the differential case 10 is one example of a "first member" in the present invention and the differential ring gear 12 is one example of a "second member" in the present invention. The direction in which the differential case 10 and the differential ring gear 12 are arranged corresponds to the radial direction of the differential ring gear 12 (the flange 16) and is one example of the "first direction" in the present invention.

The differential case 10 is a housing member internally provided with power transmission parts or components (pinion shaft, pinion gear, side gear, etc.) with respect to a drive shaft (not shown). The differential ring gear 12 includes a teeth part 24 formed as a helical gear and serves as a gear member engaging with a drive pinion (not shown) to which power is transmitted from an engine (not shown). The power input from the drive pinion to the differential ring gear 12 is transmitted to a drive shaft (not shown) connected to a drive wheel (not shown). The differential case 10 is made of cast iron and the differential ring gear 12 is made of steel.

Figure 4:
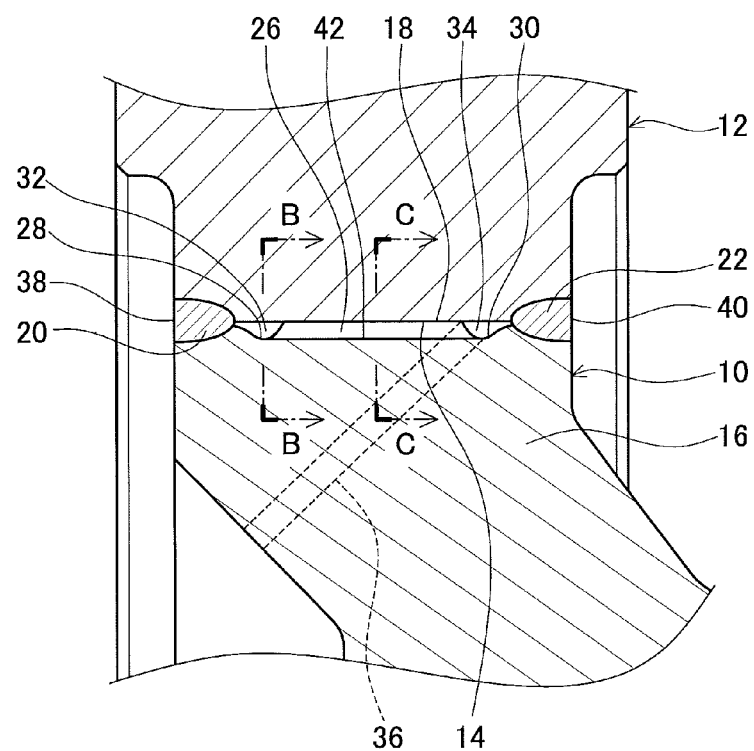
FIG. 4 is an enlarged view of a joining part between the differential case and the differential ring gear in FIG. 3.

FIG. 4 is an enlarged view of a joining part between the differential case 10 and the differential ring gear 12 in FIG. 3. As shown in FIG. 4, in the joining part between the outer peripheral surface 18 of the flange 16 of the differential case 10 and the inner peripheral surface 14 of the differential ring gear 12, the weld bead 20 and the weld bead 22 are formed on both ends in a direction of a central axis S (see FIG. 3, a right and left direction in FIG. 4) of the differential ring gear 12. The central axis-S direction is one example of a "second direction" of the invention.

As shown in FIG. 4, the outer peripheral surface 18 of the flange 16 is provided with a press-fit portion 26, and grooves 28 and 30 formed on both sides in the central axis-S direction (see FIG. 3, the right and left direction in FIG. 4) with respect to the press-fit portion 26. The press-fit portion 26 is formed in the outer peripheral surface 18 at a substantially center part in the central axis-S direction. In this press-fit portion 26, the inner peripheral surface 14 of the differential ring gear 12 is press-fit on the outer peripheral surface 18 of the flange 16.

The grooves 28 and 30 define cavities 32 and 34 respectively with respect to the inner peripheral surface 14 of the differential ring gear 12. Specifically, the cavities 32 and 34 are formed respectively on both sides of the press-fit portion 26 in the central axis-S direction. The differential case 10 is further formed with a through hole 36 communicating the cavity 34 with the outside of the differential case 10. The through hole 36 is formed in a position different from a position on the cross section shown in FIG. 4 in a circumferential direction of the differential case 10.

The weld bead 20 is formed between the cavity 32 and a left end 38 of the joining part between the flange 16 and the differential ring gear 12 in the central axis-S direction in FIG. 4. The weld bead 22 is formed between the cavity 34 and a right end 40 of the joining part between the flange 16 and the differential ring gear 12 in the central axis-S direction in FIG. 4.

Figure 5:
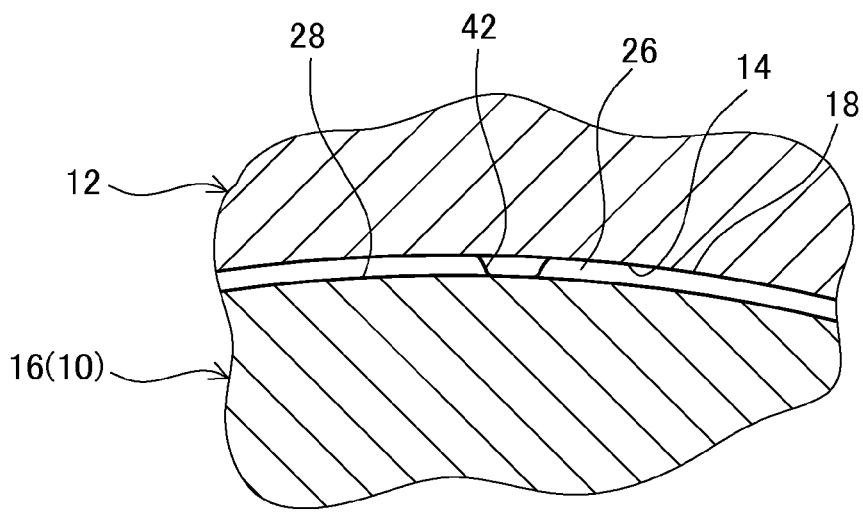
FIG. 5 is a cross sectional view taken along a line B-B in FIG. 4.
Figure 6:
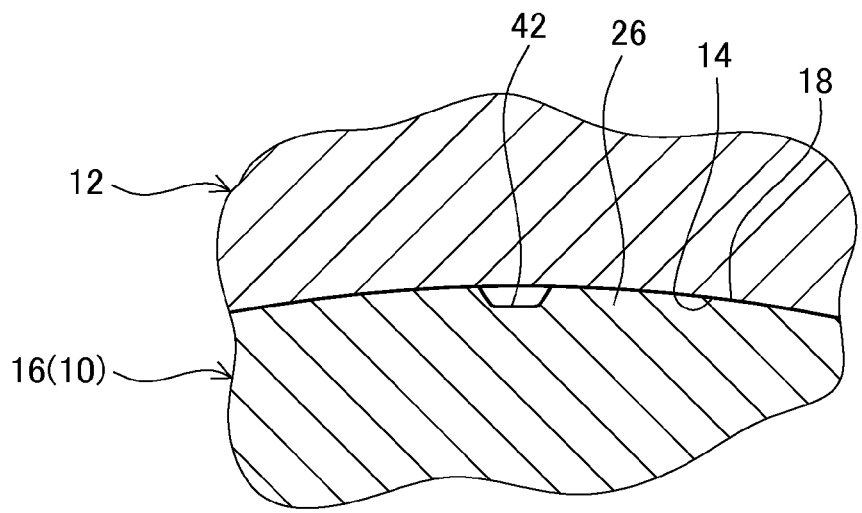
FIG. 6 is a cross sectional view taken along a line C-C in FIG. 4.
Figure 7:
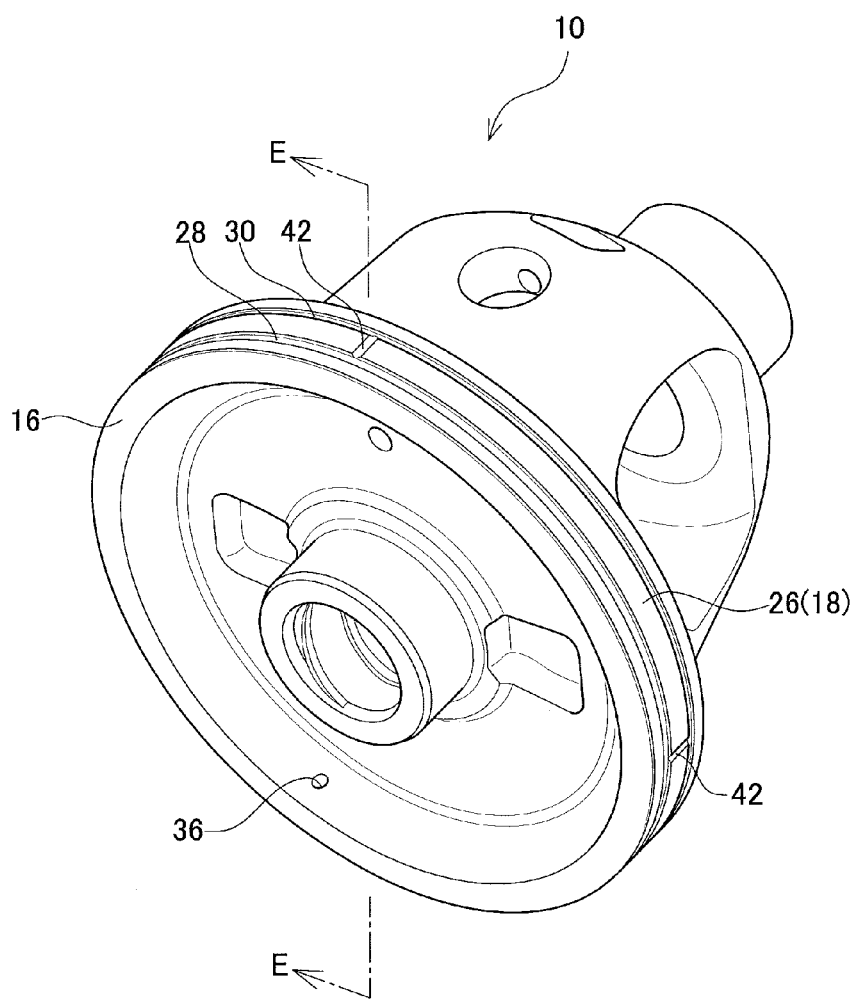
FIG. 7 is an external perspective view of the differential case in Example 1.

Herein, FIG. 5 is a cross sectional view taken along a line B-B in FIG. 4. FIG. 6 is a cross sectional view taken along a line C-C in FIG. 4. FIG. 7 is an external perspective view of the differential case 10. In the present example, as shown in FIGS. 4 to 7, the press-fit portion 26 of the flange 16 of the differential case 10 is formed with a cutout groove(s) 42. This cutout groove 42 is formed in one or more positions in the circumferential direction of the flange 16. In the example shown in FIG. 7, the cutout grooves 42 are arranged at intervals of 90° in the circumferential direction of the flange 16, that is, formed in four positions in total. Each cutout groove 42 communicates between the cavity 32 and the cavity 34 as shown in FIG. 4. Each cutout groove 42 is formed by cutting after the differential case 10 is produced by casting or each cutout groove 42 is formed concurrently when the differential case 10 is produced by casting. The above is a general description of the welding structure of the present example.

(Explanation of Method for Manufacturing Welding Structure)

Figure 8:
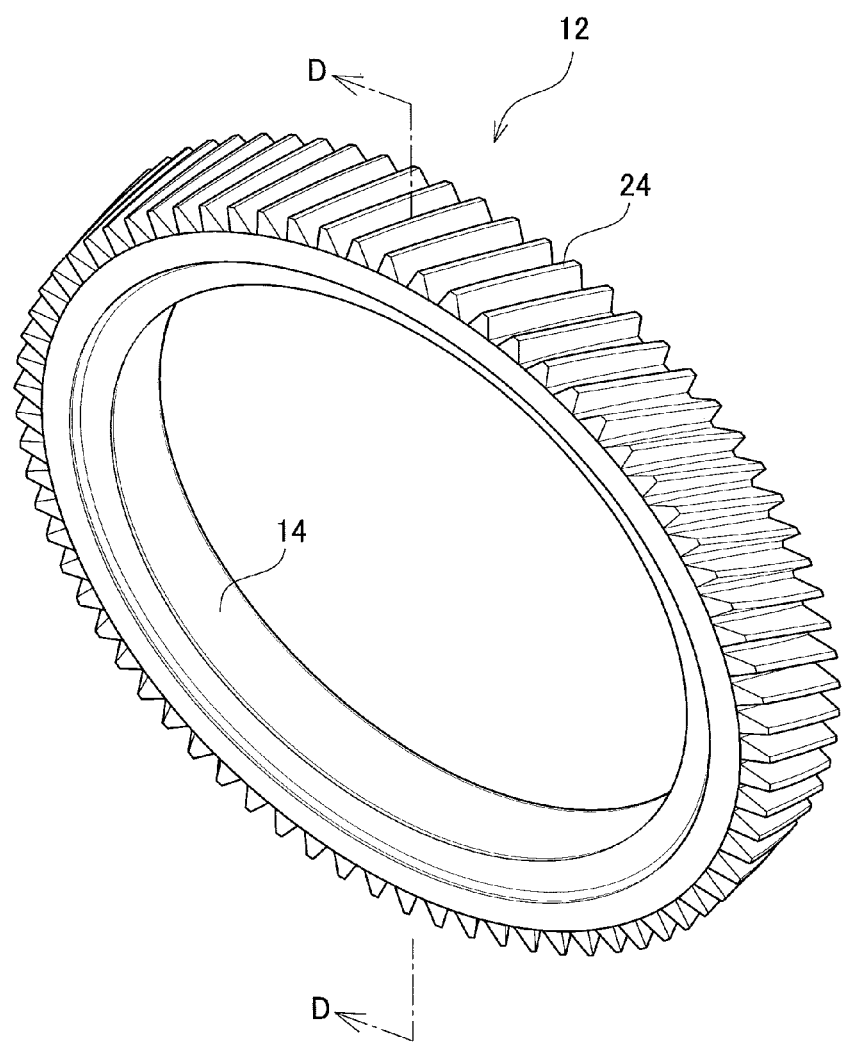
FIG. 8 is an external perspective view of the differential ring gear in Example 1.
Figure 9:
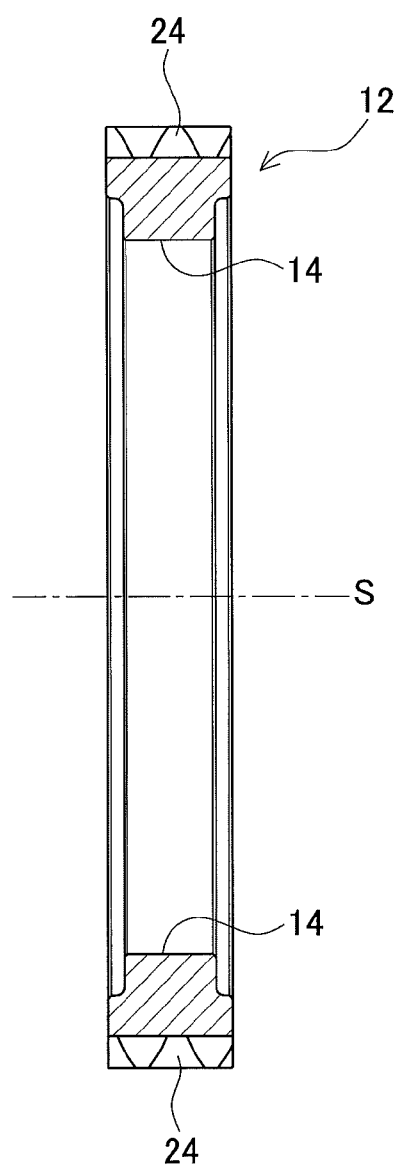
FIG. 9 is a cross sectional view taken along a line D-D in FIG. 8.
Figure 10:
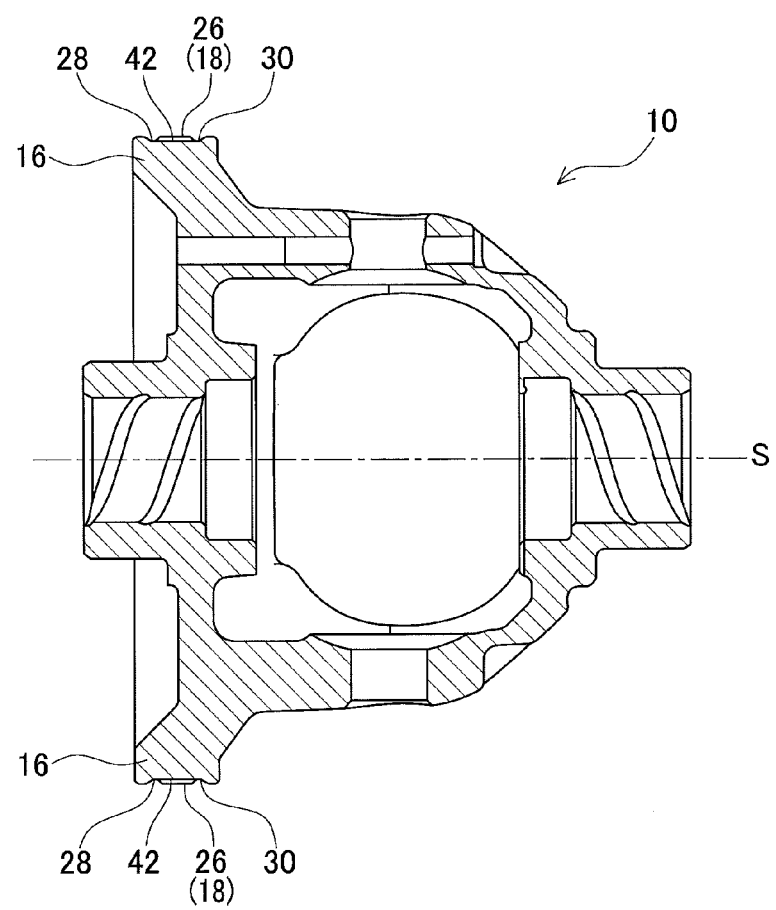
FIG. 10 is a cross sectional view taken along a line E-E in FIG. 7.
Figure 11:
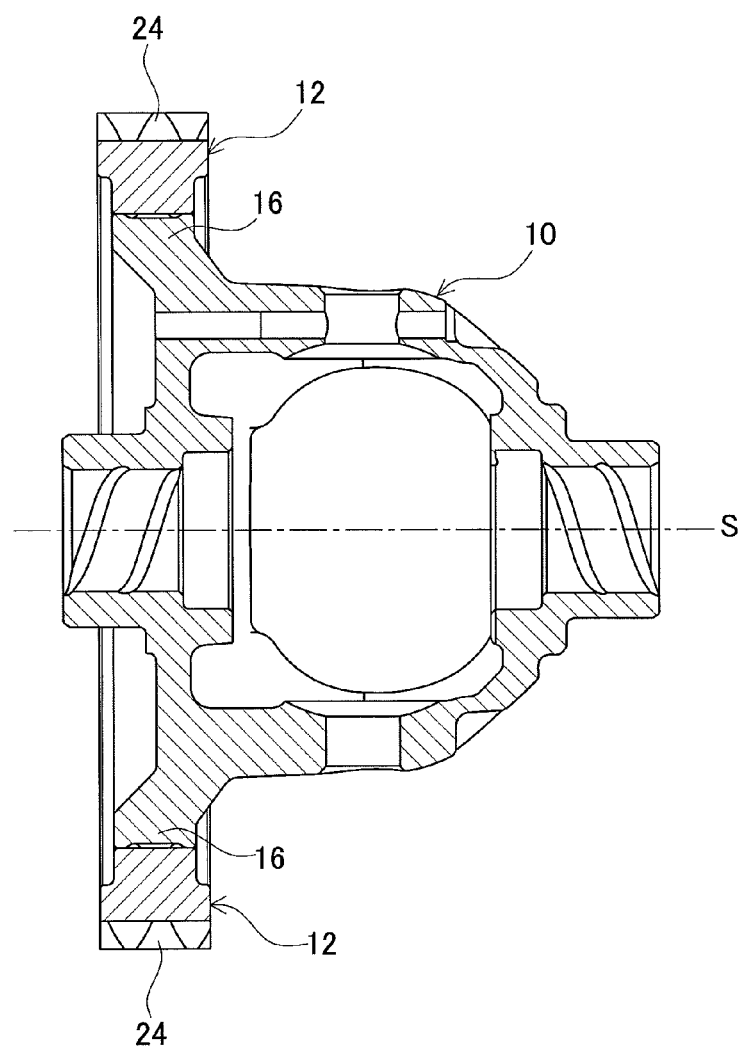
FIG. 11 is a cross sectional view of a press-fit structure for the differential case and the differential ring gear in Example 1.
Figure 12:
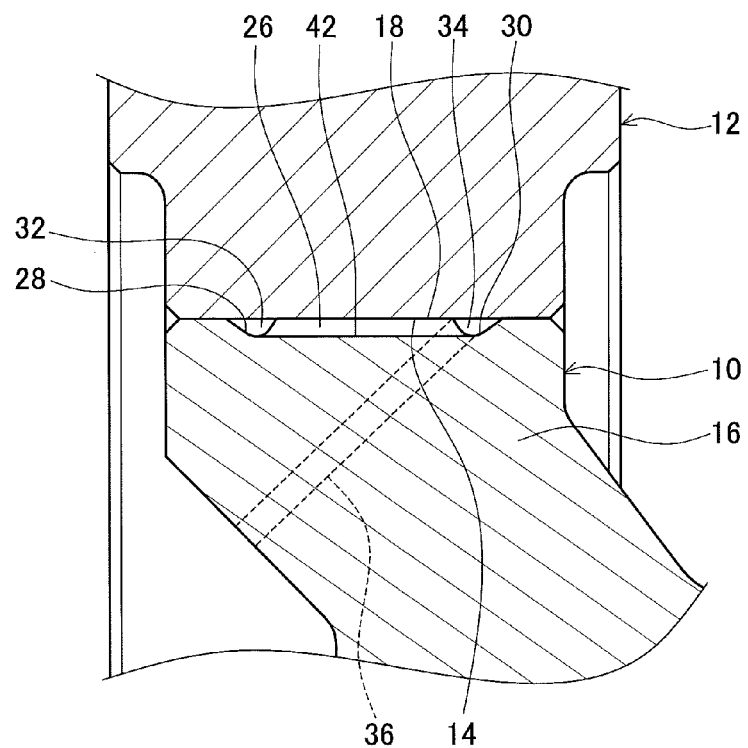
FIG. 12 is an enlarged view of a joining part between the differential case and the differential ring gear in FIG. 11.

Next, a method for manufacturing the welding structure between the differential case 10 and the differential ring gear 12 will be explained. Herein, FIG. 8 is an external perspective view of the differential ring gear 12 and FIG. 9 is a cross sectional view taken along a line D-D in FIG. 8. FIG. 10 is a cross sectional view taken along a line E-E in FIG. 7. Further, FIG. 11 is a cross sectional view of a press-fit structure between the differential case 10 and the differential ring gear 12. FIG. 12 is an enlarged view of the joining part between the differential case 10 and the differential ring gear 12 in FIG. 11.

In the present example, the differential ring gear 12 shown in FIGS. 8 and 9 is press-fit on the differential case 10 shown in FIGS. 7 and 10. Accordingly, as shown in FIG. 11, the press-fit structure of the differential case 10 and the differential ring gear 12 is formed.

In this press-fit structure, as shown in FIG. 12, the cavities 32 and 34 are formed in the joining part between the flange 16 of the differential case 10 and the differential ring gear 12. To be specific, the cavity 32 is formed between the groove 28 and the inner peripheral surface 14 of the differential ring gear 12 and the cavity 34 is formed between the groove 30 and the inner peripheral surface 14 of the differential ring gear 12. These cavities 32 and 34 are hollows each formed over one circuit in the circumferential direction of the differential ring gear 12 (the flange 16). The cutout grooves 42 formed in the press-fit portion 26 provide holes between them and the inner peripheral surface 14 of the differential ring gear 12, thereby communicating between the cavity 32 and the cavity 34.

In the press-fit structure between the differential ring gear 12 and the differential case 10, firstly, welding is conducted from a left side in FIG. 12 in the central axis-S direction to form the weld bead 20 so as to reach to the cavity 32. This welding is performed over one circuit in the circumferential direction of the differential ring gear 12 (the flange 16). Successively, welding is conducted from a right side in FIG. 12 in the central axis-S direction to form the weld bead 22 so as to reach to the cavity 34. This welding is performed over one circuit in the circumferential direction of the differential ring gear 12 (the flange 16). In this manner, the welding structure between the differential case 10 and the differential ring gear 12 shown in FIGS. 1 to 4 is produced. It is to be noted that the order of forming the weld bead 20 and the weld bead 22 is not particularly limited. Thus, the weld bead 20 may be formed after the weld bead 22 is formed.

In the present example, the cutout grooves 42 serve to communicate between the cavities 32 and 34. At the time of welding to form the weld bead 20, therefore, the gas expanded in the cavity 32 by heat is allowed to flow in the cavity 34 through the cutout grooves 42. Since the through hole 36 communicates the cavity 34 with the outside of the differential case 10, the above gas is discharged to the outside of the differential case 10 through the through hole 36. Accordingly, the internal pressure in the cavity 32 does not rise and also any pressure that pushes a molten pool generated during welding does not occur. Consequently, the weld bead 20 can be formed with good quality.

On the other hand, at the time of welding to form the weld bead 22, the gas expanded in the cavity 34 by heat is directly released to the outside of the differential case 10 through the through hole 36. Accordingly, the internal pressure in the cavity 34 does not rise and also any pressure that pushes a molten pool generated during welding does not occur. Accordingly, the weld bead 22 can be formed with good quality.

In the above manner, the quality of the weld beads 20 and 22 can be improved. This results in an improved weld quality of the welding structure between the differential case 10 and the differential ring gear 12. Further, since there is no need to additionally form any through hole to communicate the cavity 32 with the outside of the differential case 10, cost reduction can be achieved.

Since the differential case 10 is a cast, the cutout grooves 42 are easily made when they are subjected to cutting. The cutout grooves 42 are formed in the outer peripheral surface 18 of the flange 16 and thus they are easily machined with a cutting tool when they are subjected to cutting.

Effects of the Present Example

According to the present example, as explained above, the cutout grooves 42 are provided to communicate between the cavity 32 and the cavity 34. Therefore, the gas expanded in the cavity 32 when the weld bead 20 is being formed is allowed to flow from the cavity 32 to the cavity 34 through the cutout grooves 42, and then the gas is discharged out of the cavity 34. In the welding structure between the differential case 10 and the differential ring gear 12, therefore, cost reduction and improvement of weld quality can be achieved.

The presence of the through hole 36 communicating the cavity 34 with the outside of the differential case 10 can make sure to discharge the gas expanded in the cavity 32 to the outside during forming of the weld bead 20 and also make sure to discharge the gas expanded in the cavity 34 to the outside during forming of the weld bead 22. Accordingly, in the welding structure between the differential case 10 and the differential ring gear 12, the weld quality can be reliably improved.

Modified Examples

Figure 13:
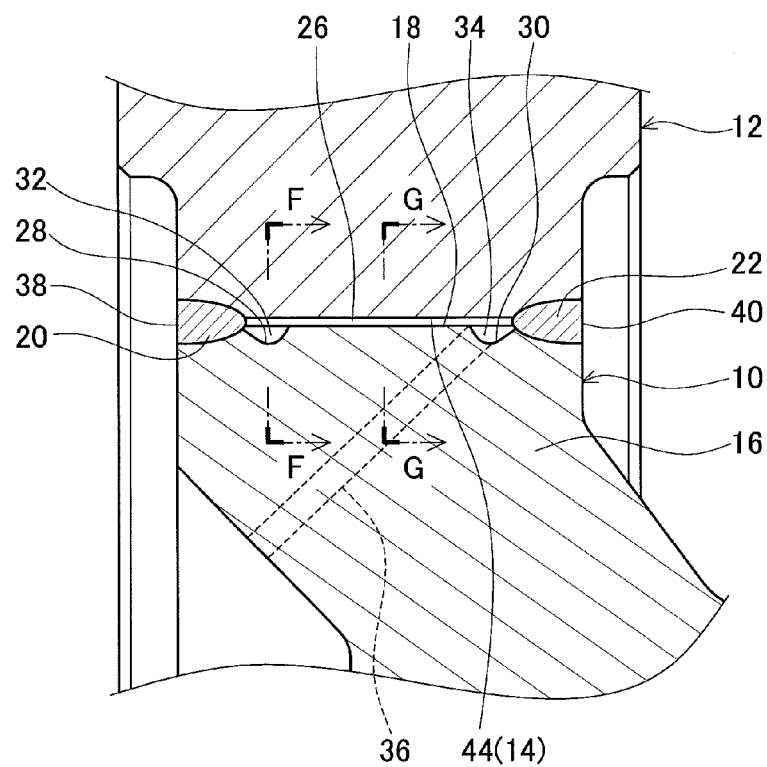
FIG. 13 illustrates a modified example of Example 1, showing an enlarged view of a joining part between a flange of the differential case and the differential ring gear in the welding structure for the differential case and the differential ring gear.
Figure 14:
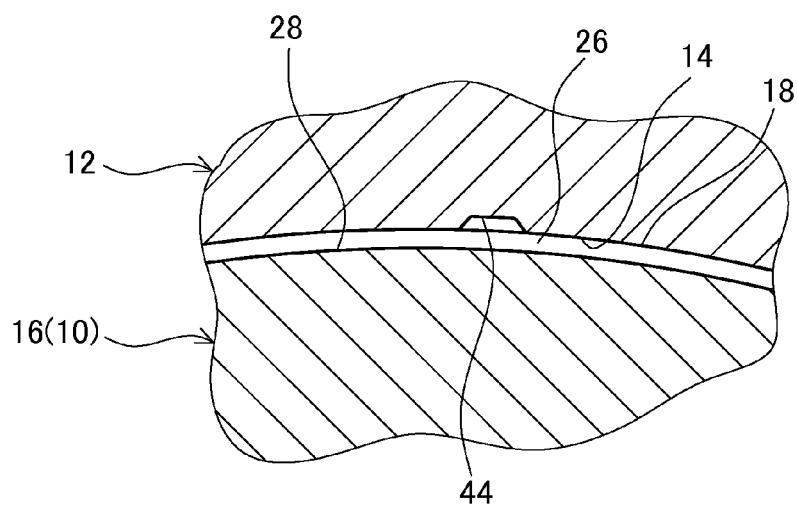
FIG. 14 is a cross sectional view taken along a line F-F in FIG. 13.
Figure 15:
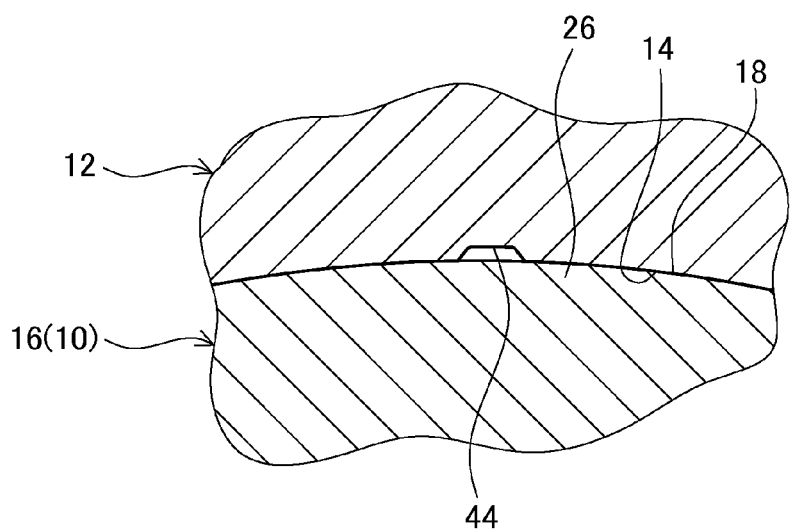
FIG. 15 is a cross sectional view taken along a line G-G in FIG. 13.

As a first modified example, instead of forming the cutout grooves 42 formed in the outer peripheral surface 18 of the flange 16 of the differential case 10, it is conceivable to form a cutout groove(s) 44 are formed in the inner peripheral surface 14 of the differential ring gear 12 as shown in FIGS. 13 to 15. In this manner, the cutout groove 44 communicates between the cavity 32 and the cavity 34. FIG. 13, which is a view corresponding to FIG. 4, is an enlarged view of a joining part between the flange 16 of the differential case 10 and the differential ring gear 12 in the welding structure between the differential case 10 and the differential ring gear 12. FIG. 14 is a cross sectional view taken along a line F-F in FIG. 13. FIG. 15 is a cross sectional view taken along a line G-G in FIG. 13.

The cutout groove 44 is formed in one or more positions in the circumferential direction of the differential ring gear 12. Herein, for example, the cutout grooves 44 are arranged at intervals of 90° in the circumferential direction of the differential ring gear 12, that is, formed in four positions in total. Each cutout groove 44 is formed by cutting after the differential ring gear 12 is produced by casting or each cutout groove 44 is formed concurrently when the differential ring gear 12 is produced by casting.

Such a modified example can provide the same effects as those in Example 1. Specifically, during welding to form the weld bead 20, the gas expanded in the cavity 32 is allowed to be discharged to the outside through the through hole 36 via the cutout groove 44 and the cavity 34. In the welding structure between the differential case 10 and the differential ring gear 12, therefore, cost reduction and improvement of weld quality can be achieved.

As an alternative, the through hole 36 may be formed to communicate the cavity 32 with the outside of the differential case 10, instead of communicating the cavity 34 with the outside of the differential case 10. This configuration allows the gas expanded in the cavity 34 by heat to flow in the cavity 32 through the cutout grooves 42 and then be discharged out of the differential case 10 through the through hole 36 during welding to form the weld bead 22. Accordingly, the internal pressure in the cavity 34 does not rise and any pressure that pushes a molten pool generated at the time of welding does not occur. Thus, the weld bead 22 can be formed with good quality.

On the other hand, during welding to form the weld bead 20, the gas expanded in the cavity 32 by heat is directly discharged to the outside of the differential case 10 through the through hole 36. Accordingly, the internal pressure in the cavity 32 does not rise and any pressure that pushes a molten pool generated at the time of welding does not occur. Thus, the weld bead 20 can be formed with good quality.

As above, the quality of the weld beads 20 and 22 can be improved. This results in an improved weld quality of the welding structure between the differential case 10 and the differential ring gear 12. Further, since there is no need to additionally form any through hole to communicate the cavity 34 with the outside of the differential case 10, cost reduction can be achieved.

Example 2

Figure 16:
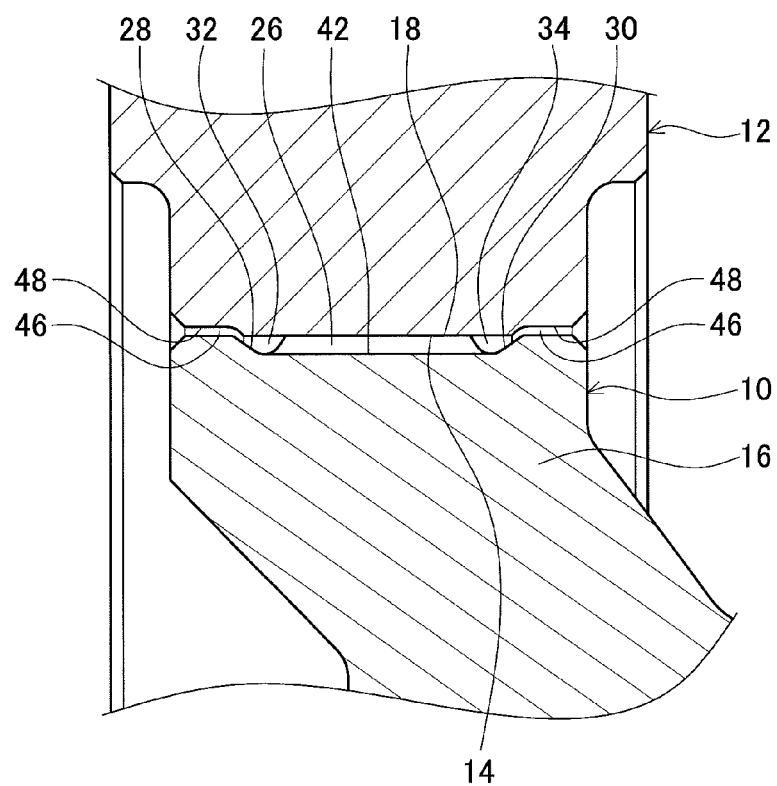
FIG. 16 is an enlarged cross sectional view of a joining part between a flange of a differential case and a differential ring gear in a press-fit structure for the differential case and the differential ring gear before welding in Example 2.
Figure 17:
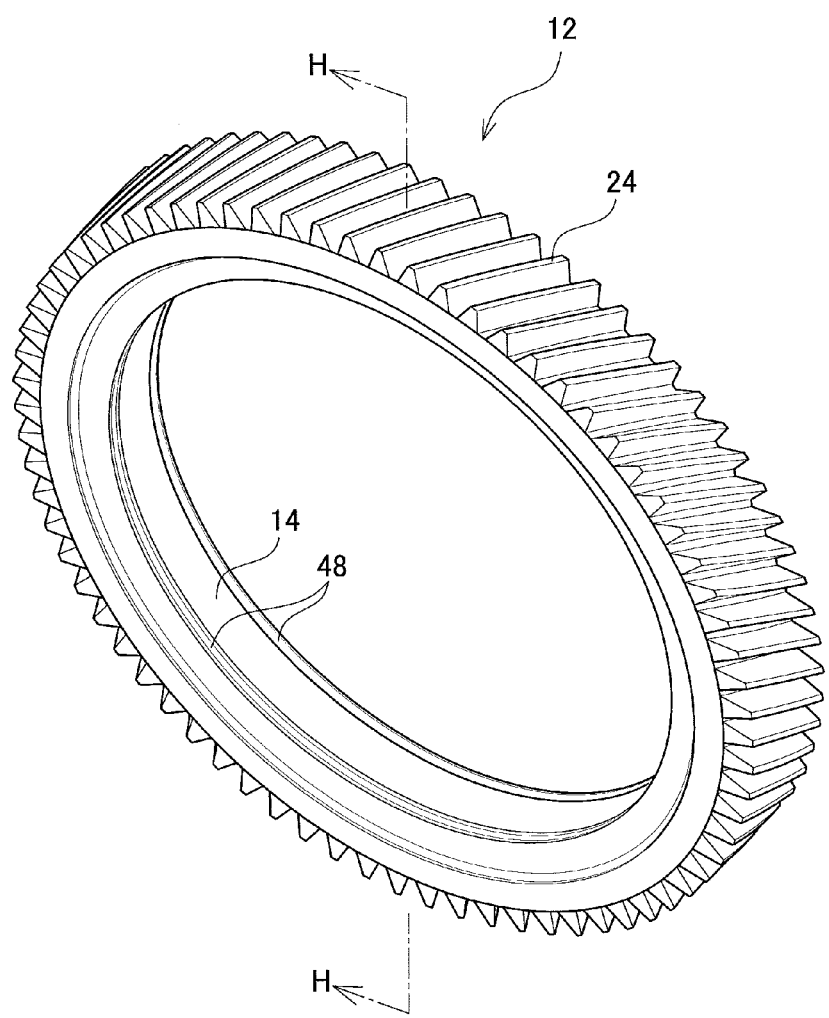
FIG. 17 is an external perspective view of the differential ring gear in Example 2.
Figure 18:
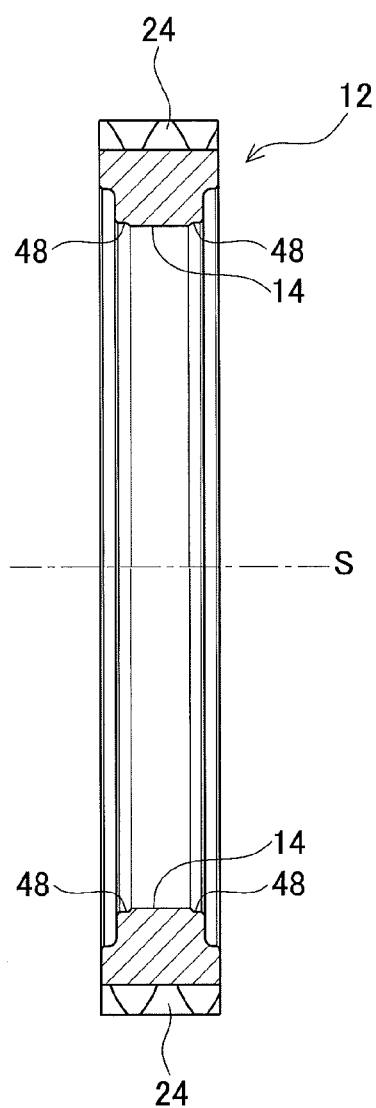
FIG. 18 is a cross sectional view taken along a line H-H in FIG. 17.

Example 2 will be explained below. The following explanation is given using the same reference signs for similar or identical parts to those in Example 1, with omission of the details thereof, and with a focus on differences from Example 1. FIG. 16 is an enlarged cross sectional view of a joining part between the flange 16 of the differential case 10 and the differential ring gear 12 in the press-fit structure between the differential case 10 and the differential ring gear 12 before welding. FIG. 17 is an external perspective view of the differential ring gear 12. FIG. 18 is a cross sectional view taken along a line H-H in FIG. 17.

(Explanation of Welding Structure)

The present example is configured such that, instead of the through hole 36, gaps 46 are formed between the outer peripheral surface 18 of the flange 16 and the inner peripheral surface 14 of the differential ring gear 12 in the press-fit structure between the differential case 10 and the differential ring gear 12 before welding as shown in FIG. 16. The gaps 46 communicate the cavity 32 with the outside of the differential ring gear 12 and the cavity 34 with the outside of the differential ring gear 12. Each gap 46 is formed between one of shoulders 48 (see FIGS. 17 and 18) formed on both ends of the inner peripheral surface 14 of the differential ring gear 12 in the central axis-S direction of the differential ring gear 12 and the outer peripheral surface 18 of the flange 16.

(Explanation of Method for Manufacturing Welding Structure)

Next, a method for manufacturing the welding structure between the differential case 10 and the differential ring gear 12 will be explained. In the present example, the differential ring gear 12 shown in FIGS. 17 and 18 are press-fit on the differential case 10 shown in FIGS. 7 and 10. Thus, the press-fit structure between the differential case 10 and the differential ring gear 12 is formed. In this press-fit structure, as shown in FIG. 16, the gaps 46 provide communication between the outside and the cavity 32 and between the outside and the cavity 34.

Figure 19:
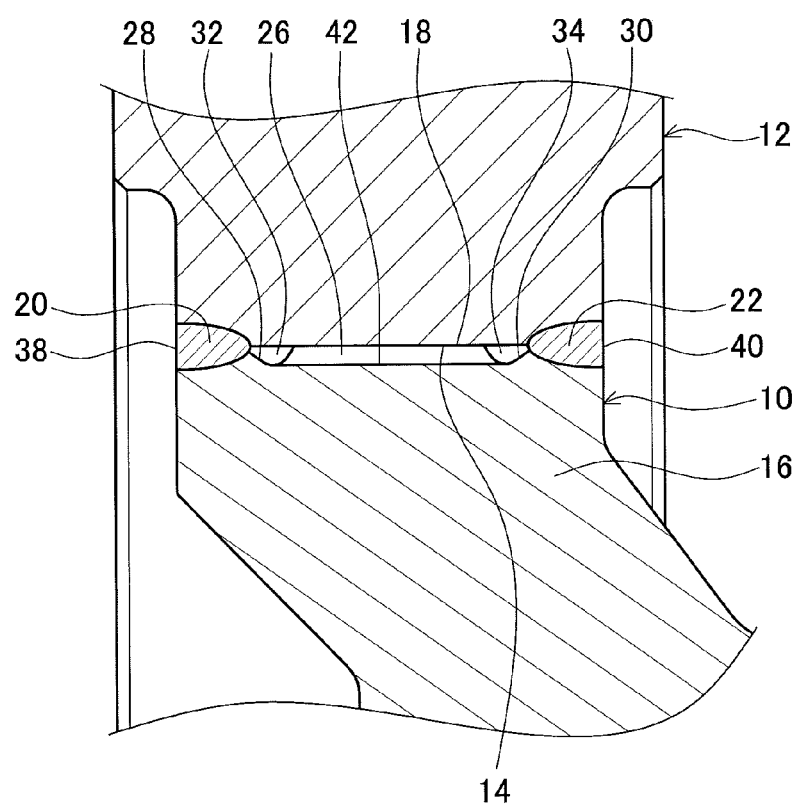
FIG. 19 is an enlarged cross sectional view of a joining part between the flange of the differential case and the differential ring gear in the welding structure for the differential case and the differential ring gear in Example 2.

In the press-fit structure between the differential ring gear 12 and the differential case 10, firstly, welding is conducted from a left side in FIG. 16 in the central axis-S direction to form the weld bead 20 so as to reach to the cavity 32 while filling in the gap 46. This welding is performed over one circuit in the circumferential direction of the differential ring gear 12 (the flange 16). Successively, welding is conducted from a right side in FIG. 16 in the central axis-S direction to form the weld bead 22 so as to fill the gap 46. At that time, this welding is performed over one circuit in the circumferential direction of the differential ring gear 12 (the flange 16). In this manner, the welding structure between the differential case 10 and the differential ring gear 12 is produced. Herein, the welding structure produced as above is illustrated in FIG. 19 showing an enlarged cross sectional view of the joining part between the differential case 10 and the differential ring gear 12. The order of forming the weld bead 20 and the weld bead 22 is not particularly limited. Thus, the weld bead 20 may be formed after the weld bead 22 is formed.

In the present example, the press-fit structure between the differential ring gear 12 and the differential case 10 is configured such that the cavity 34 is communicated with the outside through the gap 46 and further the cavity 32 and the cavity 34 are communicated with each other through the cutout grooves 42. Accordingly, during welding to form the weld bead 20, a part of the gas expanded in the cavity 32 by heat is discharged to the outside through the gap 46 communicating with the cavity 32 and also another part of the gas is delivered to the cavity 34 through the cutout grooves 42. Since the cavity 34 is in communication with the outside through the gap 46, the gas is discharged to the outside through the gap 46. Therefore, the internal pressure in the cavity 32 does not rise and any pressure that pushes a molten pool generated during welding does not occur. Thus, the weld bead 20 can be formed with good quality.

Subsequently, during welding to form the weld bead 22, the gas expanded in the cavity 34 by heat is discharged to the outside through the gap 46 communicating with the cavity 34. Accordingly, the internal pressure in the cavity 34 does not rise and any pressure that pushes a molten pool generated during welding does not occur. Further, in welding to form the weld bead 22, at the time when a welding start point and a welding end point are joined by welding over one circuit in the circumferential direction of the differential ring gear 12 (the flange 16), the gas in the cavity 32 and the cavity 34 has finished being sufficiently expanded by heat. At this time, therefore, such pressure that depresses the molten pool generated during welding is not exerted on the molten pool. Accordingly, the weld bead 22 can be formed with good quality.

In the above manner, the quality of the weld beads 20 and 22 can be improved. Therefore, the weld quality of the welding structure between the differential case 10 and the differential ring gear 12 can be improved. Further, there is no need to additionally form a through hole for communicating the cavity 32 with the outside of the differential case 10 and the through hole 36, so that cost reduction can be achieved.

Effects of the Present Example

According to the present example, the following effects can be obtained in addition to the effects of Example 1 mentioned above. According to the present example, when the weld bead 20 is to be formed, the gaps 46 formed between the differential case 10 and the differential ring gear 12 provide communication between the outside and the cavity 32 and between the outside and the cavity 34. When the weld bead 20 is formed, therefore, the gas expanded in the cavity 32 is allowed to be surely discharged to the outside. Consequently, the welding structure between the differential case 10 and the differential ring gear 12 can reliably provide the improved weld quality.

Modified Examples

Figure 20:
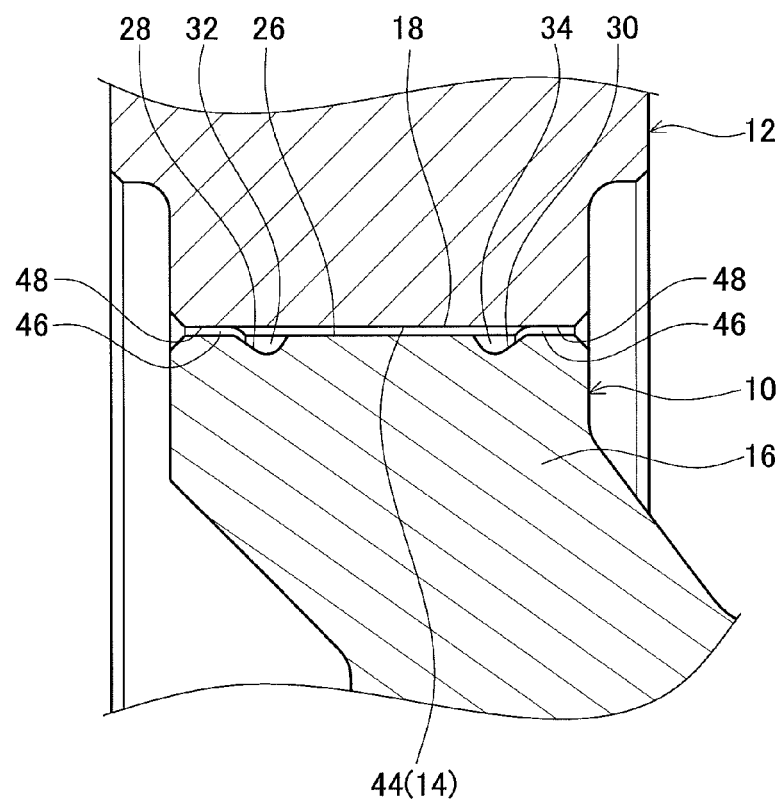
FIG. 20 illustrates a modified example of Example 2, showing an enlarged cross sectional view of a joining part between a flange of the differential case and the differential ring gear in the press-fit structure for the differential case and the differential ring gear before welding.

As a modified example of Example 2, it is also conceivable to form cutout grooves 44 in the inner peripheral surface 14 of the differential ring gear 12 as shown in FIG. 20, instead of the cutout grooves 42 formed in the outer peripheral surface 18 of the flange 16 of the differential case 10. In this modified example, similar to the effects of Example 2, the welding structure between the differential case 10 and the differential ring gear 12 can provide improved weld quality with reduced cost.

Example 3

Figure 21:
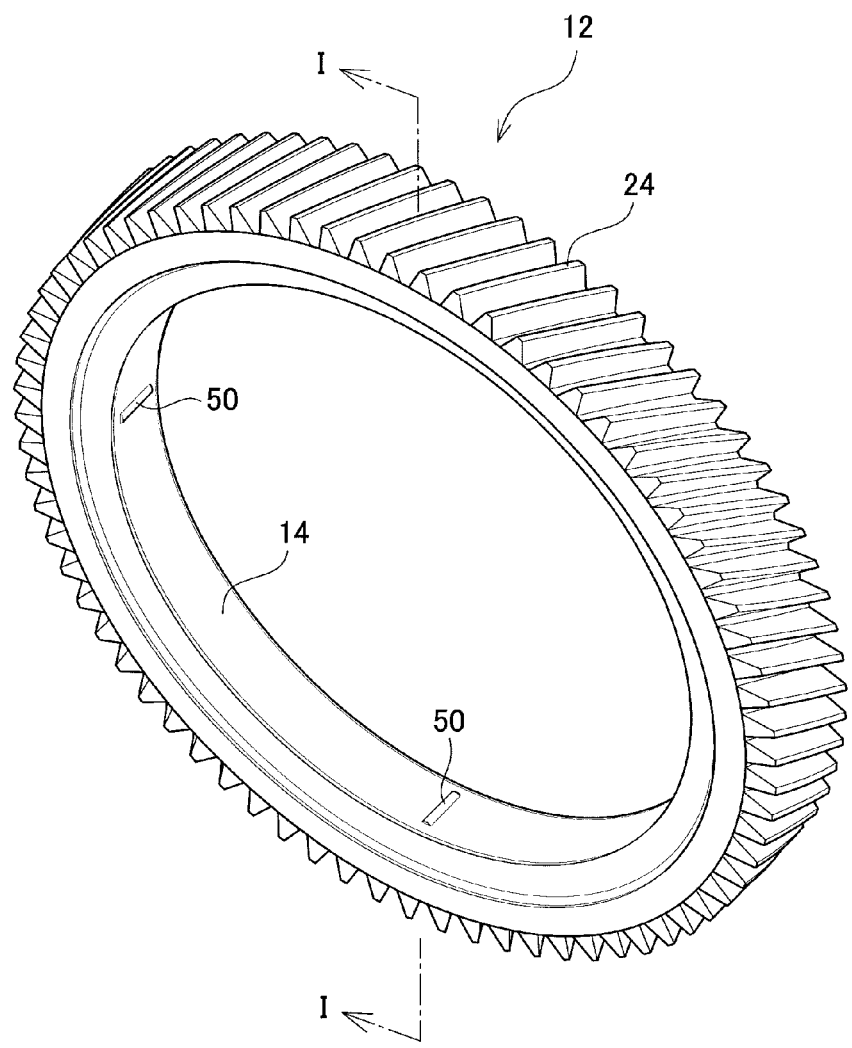
FIG. 21 is an external perspective view of a differential ring gear in Example 3.
Figure 22:
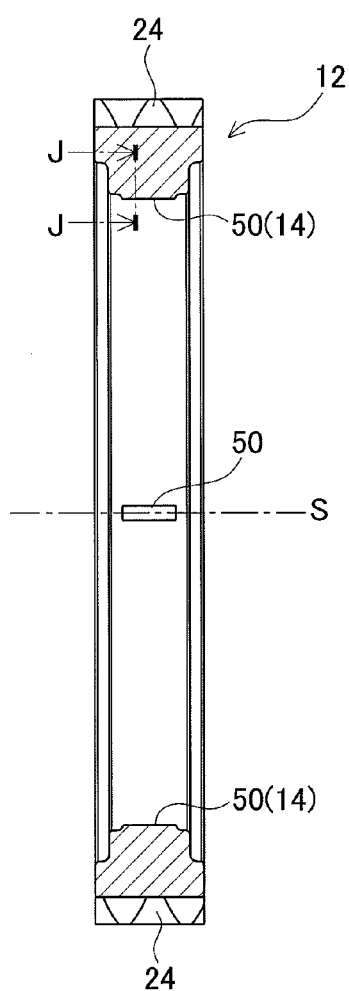
FIG. 22 is a cross sectional view taken along a line I-I in FIG. 21.
Figure 23:
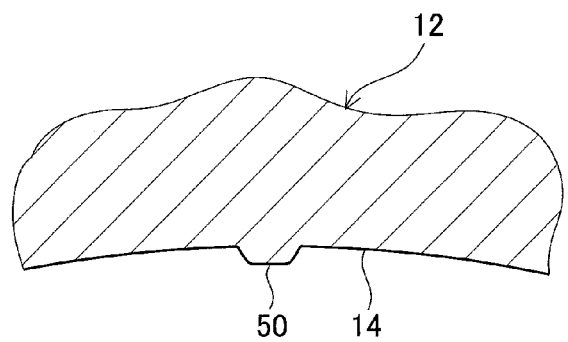
FIG. 23 is a cross sectional view taken along a line J-J in FIG. 22.
Figure 24:
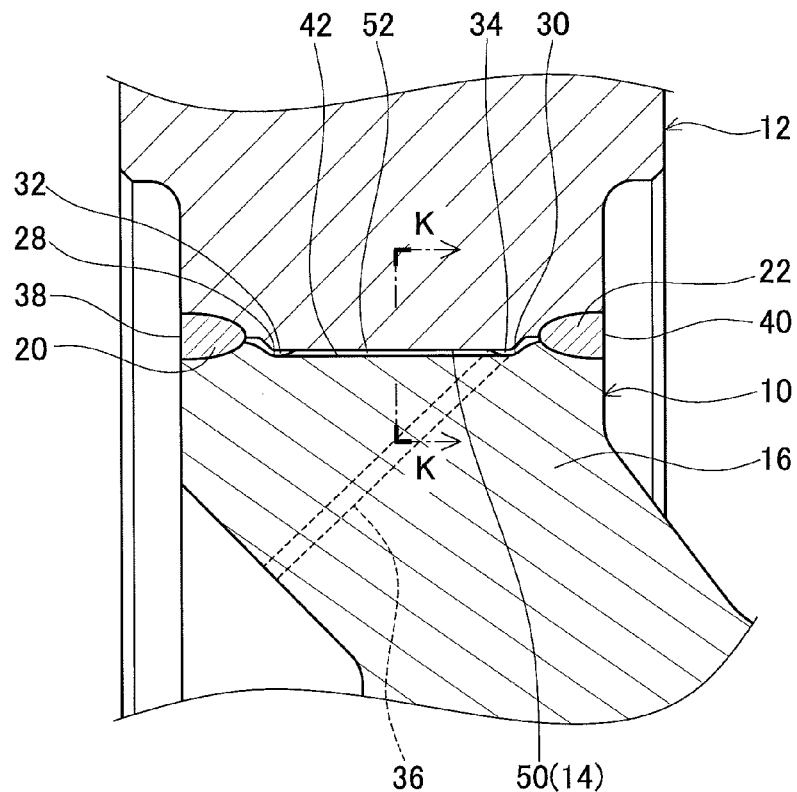
FIG. 24 is an enlarged cross sectional view of a joining part between a flange of a differential case and the differential ring gear in a welding structure for the differential case and the differential ring gear in Example 3.
Figure 25:
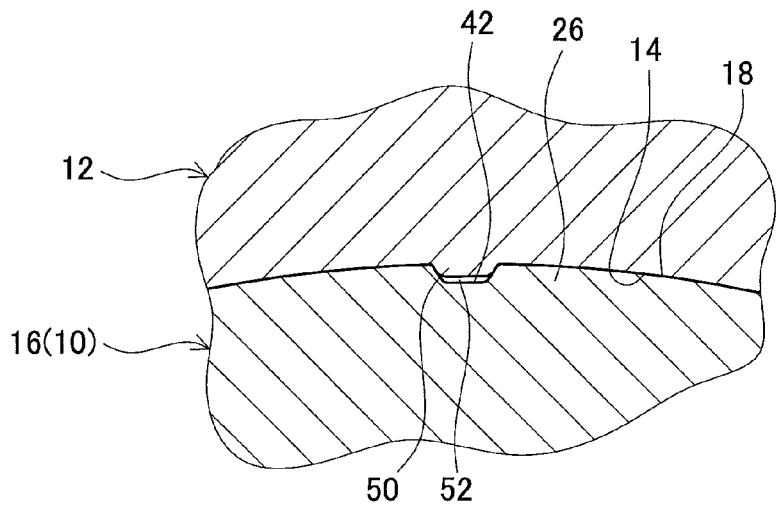
FIG. 25 is a cross sectional view taken along a line K-K in FIG. 24.

Example 3 will be explained below. The following explanation is given using the same reference signs for similar or identical parts to those in Examples 1 and 2, with omission of the details thereof, and with a focus on differences from Examples 1 and 2. FIG. 21 is an external perspective view of the differential ring gear 12 of Example 3. FIG. 22 is a cross sectional view taken along a line I-I in FIG. 21 and FIG. 23 is a cross sectional view taken along a line J-J in FIG. 22. FIG. 24 is an enlarged cross sectional view of a joining part between the flange 16 of the differential case 10 and the differential ring gear 12 in the welding structure between the differential case 10 and the differential ring gear 12 in Example 3. FIG. 25 is a cross sectional view taken along a line K-K in FIG. 24.

In the present example, as shown in FIGS. 7 and 10, the cutout grooves 42 are formed in the outer peripheral surface 18 of the flange 16 of the differential case 10. Furthermore, as shown in FIGS. 21 and 23, protrusions 50 (engagement portion) are formed in the inner peripheral surface 14 of the differential ring gear 12. These protrusions 50 are arranged in positions corresponding to the cutout grooves 42 in the circumferential direction of the differential ring gear 12 so that the protrusions 50 are inserted in and engaged with the cutout grooves 42 as shown in FIGS. 24 and 25. To be more concrete, for example, thermal insert or another technique is used to press-fit the inner peripheral surface 14 of the differential ring gear 12 onto the outer peripheral surface 18 (the press-fit portion 26) of the flange 16 of the differential case 10 so that the protrusions 50 of the differential ring gear 12 are engaged with the cutout grooves 42 of the differential case 10. In the example shown in FIG. 21, the protrusions 50 are arranged at intervals of 90° in the circumferential direction of the differential ring gear 12, that is, formed in four positions in total.

As shown in FIGS. 24 and 25, a communication hole 52 communicating between the cavity 32 and the cavity 34 is formed between each of the protrusions 50 of the differential ring gear 12 and a corresponding one of the cutout grooves 42 of the differential case 10.

In the welding structure between the differential case 10 and the differential ring gear 12, preferably, the protrusion 50 of the differential ring gear 12 is engaged with the cutout groove 42 of the differential case 10 near a joining area of a welding start point and a welding end point of each of the weld beads 20 and 22. Accordingly, the welding structure between the differential case 10 and the differential ring gear 12 can provide higher weld strength.

Effects of the Present Example

According to the present example, the following effects can be achieved in addition to the aforementioned effects in Examples 1 and 2. In the present example, the protrusions 50 inserted in and engaged with the cutout grooves 42 are provided. Engagement between the cutout grooves 42 and the protrusions 50 can prevent the differential case 10 and the differential ring gear 12 from relatively rotate with respect to each other. Thus, the power input from a drive pinion (not shown) to the differential ring gear 12 can be more stably transmitted to a drive shaft (not shown) connected to a drive wheel (not shown).

The communication holes 52 each communicating between the cavity 32 and the cavity 34 are generated between the cutout grooves 42 and the protrusions 50. Accordingly, the gas expanded in the cavity 32 when the weld bead 20 is formed by welding is allowed to flow from the cavity 32 to the cavity 34 through the communication holes 52, and then is discharged to the outside through the through hole 36. In the welding structure between the differential case 10 and the differential ring gear 12, therefore, weld quality can be improved with reduced cost.

Modified Examples

Figure 26:
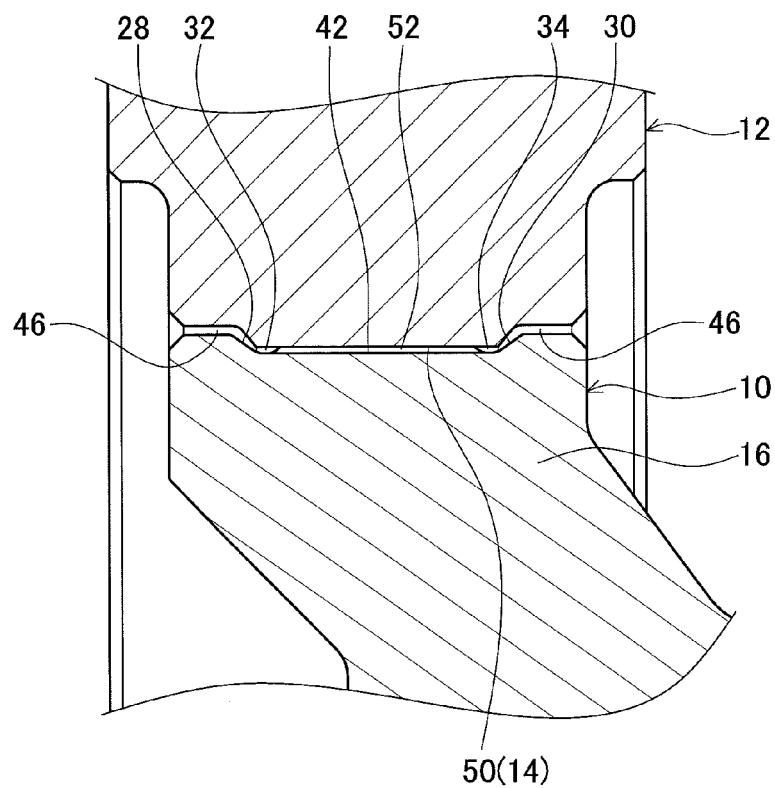
FIG. 26 illustrates a modified example of Example 3, showing an enlarged cross sectional view of a joining part between a flange of the differential case and the differential ring gear in a press-fit structure for the differential case and the differential ring gear before welding.

Moreover, as modified examples of Example 3, as shown in FIG. 26, instead of the through hole 36, gaps 46 may be formed between the outer peripheral surface 18 of the flange 16 and the inner peripheral surface 14 of the differential ring gear 12 in the press-fit structure between the differential case 10 and the differential ring gear 12 before welding.

Figure 27:
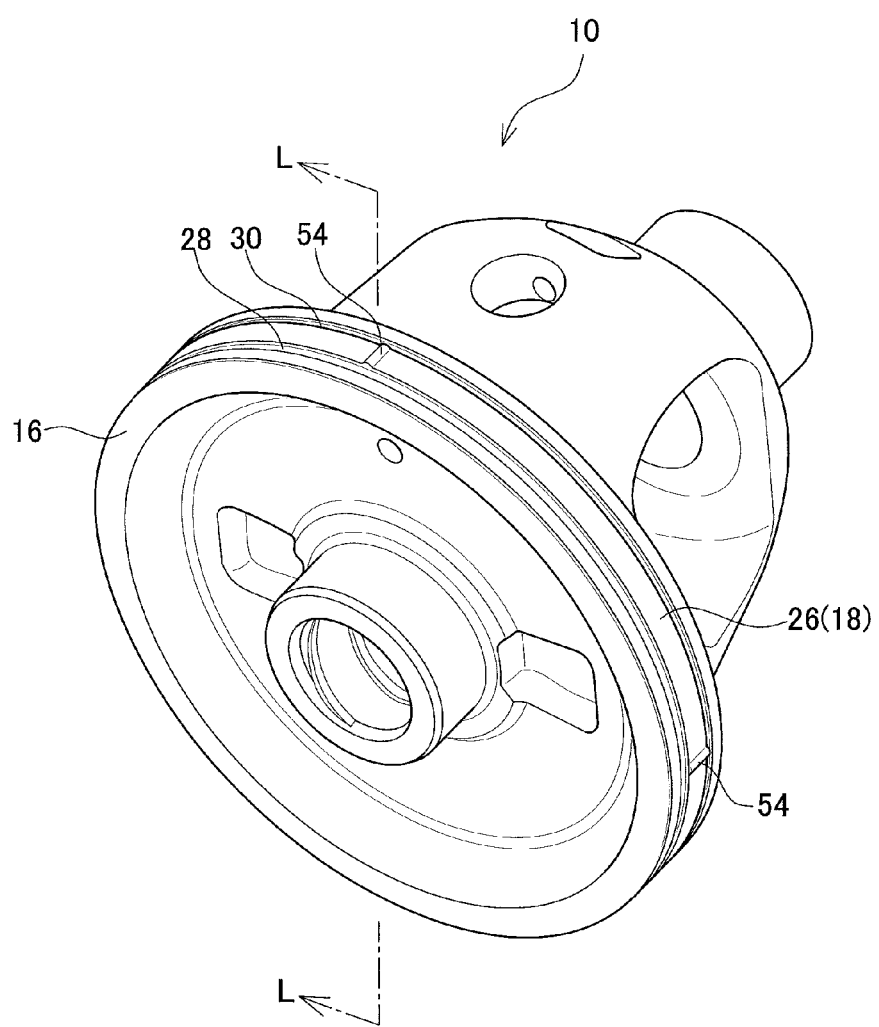
FIG. 27 illustrates another modified example of Example 3, showing an external perspective view of the differential case.
Figure 28:
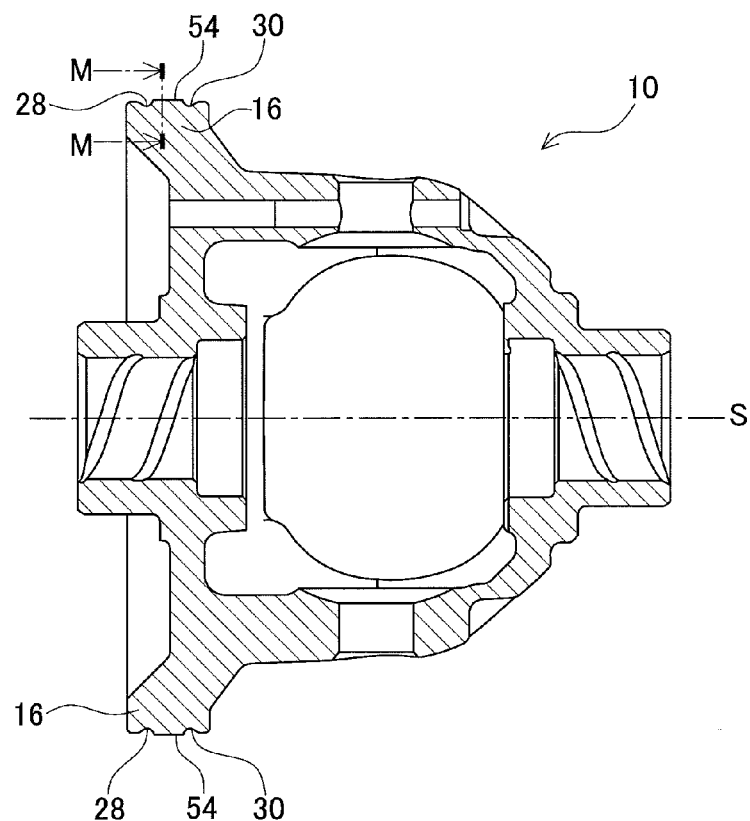
FIG. 28 is a cross sectional view taken along a line L-L in FIG. 27.
Figure 29:
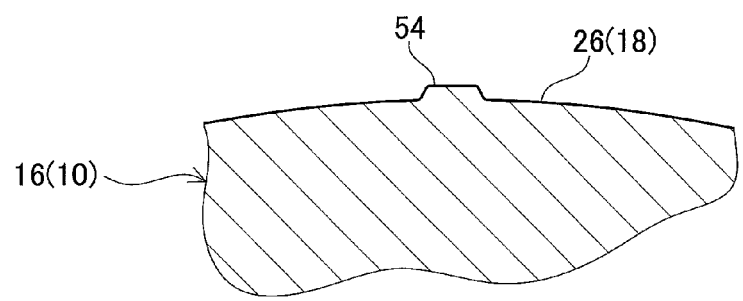
FIG. 29 is a cross sectional view taken along a line M-M in FIG. 28.
Figure 30:
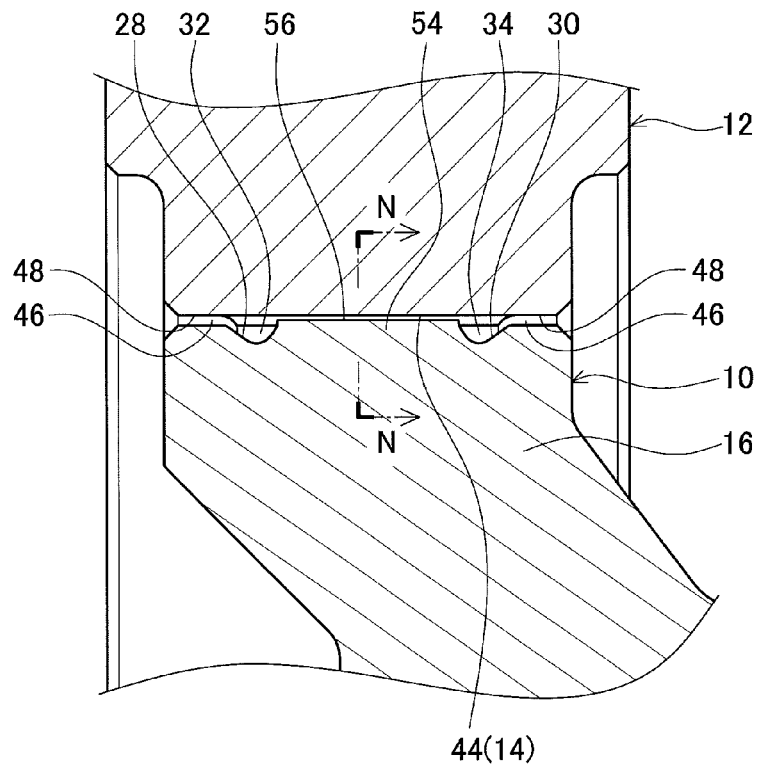
FIG. 30 illustrates another modified example of Example 3, showing an enlarged cross sectional view of a joining part between a flange of the differential case and the differential ring gear in a press-fit structure for the differential case and the differential ring gear before welding.
Figure 31:
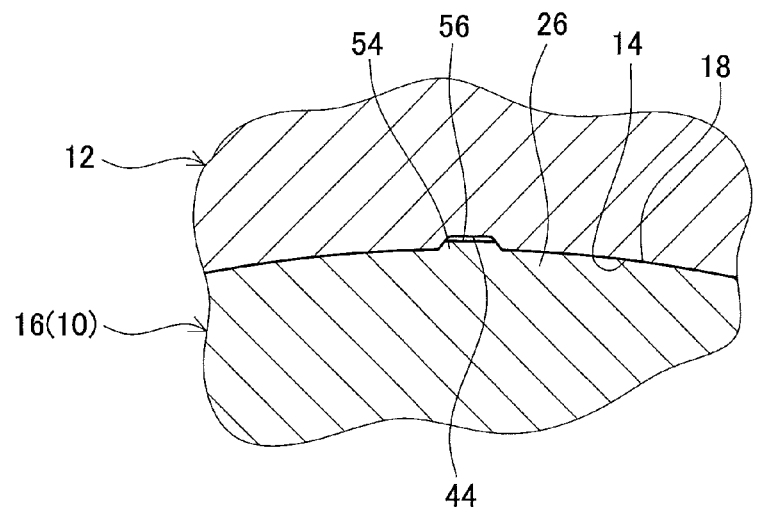
FIG. 31 is a cross sectional view taken along a line N-N in FIG. 30.

As another alternative, as shown in FIGS. 27 to 29, cutout grooves 44 are formed in the inner peripheral surface 14 of the differential ring gear 12, and protrusions 54 (engagement portion) are formed in the outer peripheral surface 18 of the flange 16 of the differential case 10. The protrusions 54 are arranged in positions corresponding to the cutout grooves 44 in the circumferential direction of the differential case 10 and, as shown in FIGS. 30 and 31 so that the protrusions 54 are inserted in and engaged with the cutout grooves 44. Furthermore, as shown in FIGS. 30 and 31, communication holes 56 are generated between the cutout grooves 44 and the protrusions 54 to communicate between the cavity 32 and the cavity 34. FIG. 27 is an external perspective view of the differential case 10 of the modified example of Example 3. FIG. 28 is a cross sectional view taken along a line L-L in FIG. 27. FIG. 29 is a cross sectional view taken along a line M-M in FIG. 28. FIG. 30 is an enlarged cross sectional view of a joining part between the flange 16 of the differential case 10 and the differential ring gear 12 in the welding structure between the differential case 10 and the differential ring gear 12 in the modified example of Example 3. FIG. 31 is a cross sectional view taken along a line N-N in FIG. 30.

Figure 32:
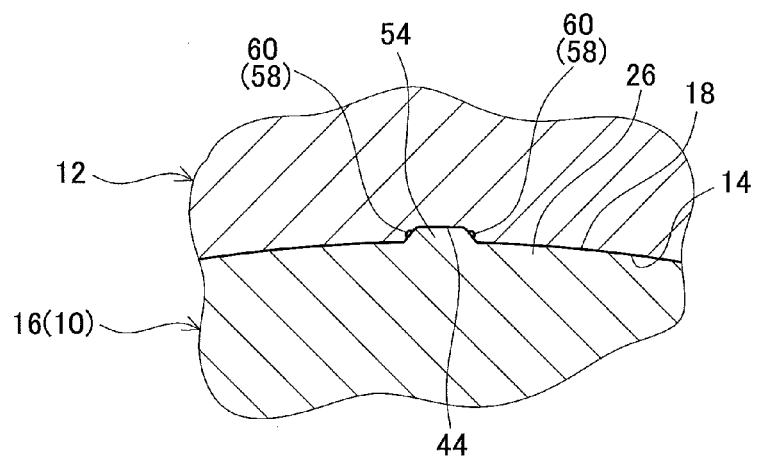
FIG. 32 illustrates another modified example of Example 3, showing a view of an example in which a communication hole is formed between a recess of a cutout groove and a protrusion.
Figure 33:
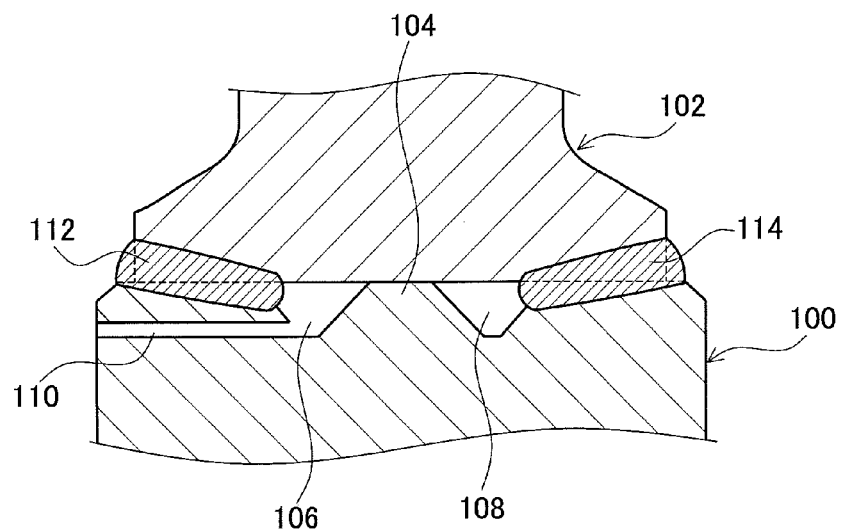
FIG. 33 is a view showing a welding structure between a differential case and a differential ring gear in an application previously filed by the present applicant.

As an alternative to the communication holes 56, it may be arranged as shown in FIG. 32 such that recesses 58 are formed in each of the cutout grooves 44 on both sides of a corresponding one of the protrusions 54 in the circumferential direction of the differential case 10, and communication holes 60 are formed between the recesses 58 and the corresponding protrusion 54 to communicate between the cavity 32 and the cavity 34. FIG. 32 is a view corresponding to FIG. 31 and shows en example in which the communication holes 60 are formed between the recesses 58 of each cutout groove 44 and the corresponding protrusion 54. Each of the aforementioned modified examples of Example 3 can provide the same operations and effects as in Example 3 mentioned above.

The aforementioned embodiments are mere examples and do not limit the scope of the invention. It should be understood that the present invention may be embodied in other specific forms without departing from the essential characteristics thereof.

REFERENCE SIGNS LIST

10 Differential case
12 Differential ring gear
14 Inner peripheral surface
16 Flange
18 Outer peripheral surface
20 Weld bead
22 Weld bead
26 Press-fit portion
32 Cavity
34 Cavity
36 Through hole
42 Cutout groove
44 Cutout groove
46 Gap
48 Shoulder
50 Protrusion
52 Communication hole
54 Protrusion
56 Communication hole
60 Communication hole

The invention claimed is:

1. A welding structure in which a first member and a second member are joined to each other by welding, wherein
assuming that a direction in which the first and second members are arranged is a first direction and a direction perpendicular to the first direction is a second direction, the welding structure includes:
a press-fit portion in which the second member is press-fit on the first member;
a first cavity formed on one side of the press-fit portion in the second direction;
a second cavity formed on the other side of the press-fit portion in the second direction;
a first weld bead formed between the first cavity and an end of a joining part between the first member and the second member on the one side in the second direction in such a manner that the first and second members are welded to each other while the second cavity is communicated with outside;
a second weld bead formed between the second cavity and an end of the joining part on the other side in the second direction; and
a cutout groove communicating between the first cavity and the second cavity.

2. The welding structure according to claim 1 further including a through hole to communicate the second cavity with the outside.

3. The welding structure according to claim 1, wherein the first weld bead is formed by welding of the first and second members to each other while the second cavity is communicated with the outside through a gap formed between the first and second members.

4. The welding structure according to claim 1, further including:
an engagement portion inserted in and engaged with the cutout groove; and
a communication hole formed between the cutout groove and the engagement portion to communicate between the first cavity and the second cavity.

5. The welding structure according to claim 1, wherein
the first member is a differential case in a differential device, and
the second member is a differential ring gear in the differential device.

6. A method for manufacturing a welding structure in which a first member and a second member are joined to each other by welding, wherein
assuming that a direction in which the first and second members are arranged is a first direction and a direction perpendicular to the first direction is a second direction, the welding structure includes:
a press-fit portion in which the second member is press-fit on the first member;
a first cavity formed on one side of the press-fit portion in the second direction;
a second cavity formed on the other side of the press-fit portion in the second direction;

a first weld bead formed between the first cavity and an end of a joining part between the first member and the second member on the one side in the second direction;

a second weld bead formed between the second cavity and an end of the joining part on the other side in the second direction;

a cutout groove communicating between the first cavity and the second cavity, and the method includes forming the first weld bead by welding the first member and the second member to each other while the second cavity is communicated with outside and the first cavity and the second cavity are communicated with each other through the cutout groove.

7. The method for manufacturing a welding structure according to claim 6, wherein the welding structure includes a through hole to communicate the second cavity with the outside.

8. The method for manufacturing a welding structure according to claim 6, wherein when the first weld bead is to be formed, the second cavity is communicated with the outside through a gap formed between the first member and the second member.

9. The method for manufacturing a welding structure according to claim 6, wherein the welding structure includes an engagement portion inserted in and engaged with the cutout groove, and a communication hole formed between the cutout groove and the engagement portion to communicate between the first cavity and the second cavity.

10. The method for manufacturing a welding structure according to claim 6, wherein
the first member is a differential case in a differential device, and
the second member is a differential ring gear in the differential device.

* * * * *